*P. W. Hardwick,*
*Apple Parer and Corer,*
N° 6,735. Patented Sep. 25, 1849.
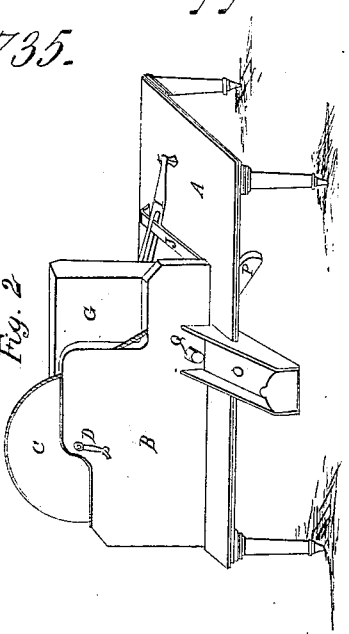
Fig. 2
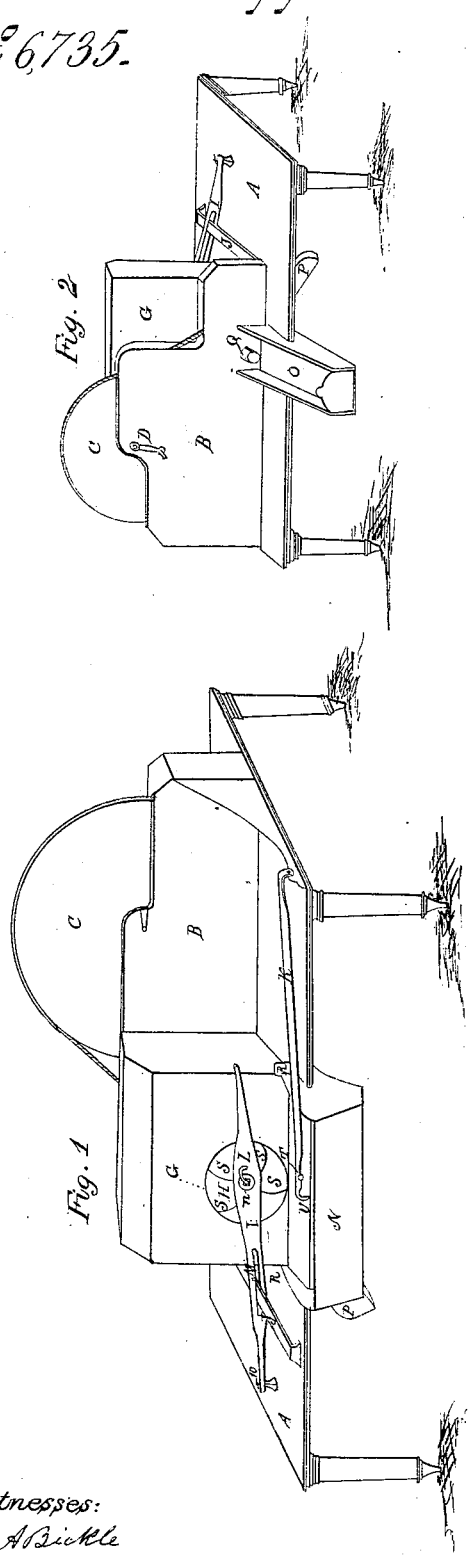
Fig. 1
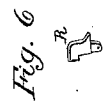
Fig. 6
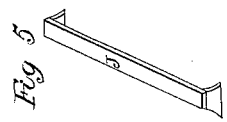
Fig. 5
Fig. 4
Fig. 3
Fig. 4
Witnesses:
Wm A Bickle
William Cox
Inventor:
P W Hardwick

UNITED STATES PATENT OFFICE.

PETER W. HARDWICK, OF WAYNE COUNTY, INDIANA.

PARING AND CORING FRUIT.

Specification of Letters Patent No. 6,735, dated September 25, 1849.

*To all whom it may concern:*

Be it known that I, PETER W. HARDWICK, of the county of Wayne and State of Indiana, have invented a new and useful Machine for Paring, Cutting, and Coring Fruit; and I do hereby declare that the following is a full, clear, and exact description of the construction and operation of the same, reference being had to the annexed drawings, making a part of this specification, in which—

Figure 1 is a perspective view of the front part of the machine and Fig. 2 is a perspective view of the rear of the same machine, in which—

Letters A, Fig. 1, and A, Fig. 2, is a table or bench resting upon four legs.

B, Fig. 1, and B, Fig. 2, is a frame secured firmly to the table and supporting the band wheels C, Fig. 1, and E, Fig. 3.

C, Fig. 1, and C, Fig. 2, is a larger band wheel turned by the crank D, Fig. 2.

D, Fig. 2, is a crank turning the larger band wheel C by hand.

E, Fig. 3, is a smaller band wheel fixed firmly upon and turning with the tin pipe or corer F F and turned by a band from the larger band wheel C, Figs. 1 and 2.

F F, Fig. 3, is a hollow tube of tin or other metal passing through the band wheel E and turning freely upon the wrists 8, 8, Fig. 3, in the frame B projecting from the frame as at Q, Fig. 2, in the rear and projecting from the opening H, Fig. 1, in front. This is the core and the end $q$ Fig. 3 projecting in front is made four square to prevent the fruit from turning around it in paring.

S, S, S, Fig. 3, are knives of tin or cutters.

G, Fig. 1, and G, Fig. 2 is a house or cover over the cutters S, S, S, Figs. 1 and 3, made of wood or sheet iron to prevent the parings from falling through on to the cutters and also to keep the parings from the cut fruit as it falls through the trough P Figs. 1 and 2 by keeping them outside the cover and allowing them to slide into the trough N intended for them.

H, Fig. 1, is an opening in the house or cover through which the fruit is forced by the arm I Figs. 1 and 4 after being pared on the projecting end $q$ Fig. 3.

I, Figs. 1 and 4, is a beam or arm playing freely on a pivot at 10 and traversing freely upon the slide J Figs. 1 and 5 as a support and guide. This arm has an opening at I, I Figs. 1 and 4 through which the end of the corer projects very slightly so that the fruit being pared this arm is brought against it by a sidewise motion and the fruit is forced in upon the cutters S, S, S, S, and is thereby divided into four or more parts, at the same time that this stroke of the arm by the action of the iron finger L Figs. 1 and 4 forces the core into the tube or corer F F Fig. 3 until succeeding cores forces it through and discharges it from the end Q, Fig. 2.

J, Figs. 1 and 5, is a slide fixed permanently upon the table upon which the arm I moves freely.

K, Figs. 1 and 7, is an arm or beam having a paring blade on the under side at T Figs. 1 and 7 and a fender of sheet iron as at U Figs. 1 and 7 to turn the parings down toward the trough N.

L, Figs. 1 and 4, is a piece of four inch or larger iron bent so as to have one end fastened in the wood of the beam I and the other end entering freely into the end of the projecting tube $q$ Fig. 3 for the purpose of driving the core of the fruit into the tube when the beam or arm I is pressed against the fruit.

M, Figs. 1 and 4, is a longitudinal opening through the arm I through which the slide J Figs. 1 and 5 passes.

N, Fig. 1 is a trough or box to receive the parings from the blade T Figs. 1 and 7 having a sliding bottom to empty it. It is held firmly to its place by being let into the edge of the table and secured firmly by a cleat R, R Figs. 1 and 6 one on each side.

O, Fig. 2, is a box or trough in the rear with a sliding end to receive the cores from the pipe or corer Q which empties into N.

P, Figs. 1 and 2, is a trough coming from under the cutting blades or cutter through the table to receive and discharge the fruit as it is pared, cored, and cut.

Q, Fig. 2, is the end of the pipe or corer F, F Fig. 3 projecting an inch or more from the frame B at which the cores are discharged into the trough O.

R, Figs. 1 and 6, is a cleat one on each side of the house or cover G to secure the trough N to its place.

The principle of the operation of this machine is that of a band wheel turned with a crank D Fig. 2 having a groove in its periphery to receive a band and communicating a quicker motion to a smaller band wheel E Fig. 3 by which the tube or corer F, F, Fig. 3 having attached firmly to it the tin knives or cutters S, S, S Fig. 3 is turned rapidly on its axis so that by forcing an apple or other fruit upon the end $q$ Fig. 3 so as to give it the motion of the tube or corer it may be pared by throwing up the arm K Figs. 1 and 7 and applying the paring blade at T to the surface of the fruit while revolving in a direction from the operator. As soon as it is pared the arm I Figs. 1 and 4 is brought in against it by a quick motion of the left hand and being thus forced in upon the knives or cutters S, S, S, S Figs. 1 and 3 it is divided by the knives into four or more parts which dropping into the trough P Figs. 1 and 2 are discharged ready for drying or other purposes into a tub or other suitable vessel—while the same blow of the arm I that drives the fruit on to the cutters also forces the tube through the fruit so as to cut out the core which is forced farther within the tube by the iron staple or finger L Figs. 1 and 4 in such a way that the succeeding core forces it still farther on through the tube until it is ejected at the end of the tube Q Fig. 2 in the rear of the machine into the trough O.

What I claim as my invention and desire to secure by Letters Patent is—

The projecting hollow tube core cutter F in combination with the lever arm I in the manner and for the purpose described and represented.

PETER W. HARDWICK.

Witnesses:
WILLIAM MORELAND,
JOHN GREGG.